US011747233B2

(12) United States Patent
Khor et al.

(10) Patent No.: US 11,747,233 B2
(45) Date of Patent: Sep. 5, 2023

(54) GAS LEAK DETECTOR CARTRIDGE

(71) Applicant: Agilent Technologies, Inc, Santa Clara, CA (US)

(72) Inventors: Chin-Seong Khor, Penang (MY); Jon-Wen Tan, Penang (MY); Heng-Dar Ling, Penang (MY)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 298 days.

(21) Appl. No.: 17/034,071

(22) Filed: Sep. 28, 2020

(65) Prior Publication Data

US 2022/0099518 A1    Mar. 31, 2022

(51) Int. Cl.
| | |
|---|---|
| *G01M 3/16* | (2006.01) |
| *G01N 1/24* | (2006.01) |
| *G01N 27/14* | (2006.01) |

(52) U.S. Cl.
CPC ............... *G01M 3/16* (2013.01); *G01N 1/24* (2013.01); *G01N 27/14* (2013.01)

(58) Field of Classification Search
CPC ............ G01M 3/16; G01N 1/24; G01N 27/14
See application file for complete search history.

(56) References Cited

U.S. PATENT DOCUMENTS

| | | | |
|---|---|---|---|
| 3,703,356 A | 11/1972 | Carter | |
| 3,786,675 A | 1/1974 | Delatorre et al. | |
| 4,369,647 A | 1/1983 | Shigemori et al. | |
| 5,889,199 A | 3/1999 | Wong et al. | |
| 6,679,098 B2 | 1/2004 | Cardinale et al. | |
| 7,112,447 B2 | 9/2006 | McGee et al. | |
| 9,021,866 B2 | 5/2015 | Takano et al. | |
| 2002/0124631 A1* | 9/2002 | Sunshine | ............ G01N 33/0009 73/860 |
| 2003/0159495 A1 | 8/2003 | Cardinale et al. | |
| 2005/0126264 A1 | 6/2005 | Komninos | |
| 2007/0081920 A1 | 4/2007 | Murphy et al. | |
| 2010/0133292 A1* | 6/2010 | Ware | .................... B67D 7/0261 222/64 |
| 2012/0049787 A1* | 3/2012 | Kuroiwa | ................... H02J 7/04 320/106 |
| 2017/0343405 A1* | 11/2017 | Webster | .................. G01F 25/10 |

(Continued)

FOREIGN PATENT DOCUMENTS

| | | | |
|---|---|---|---|
| CN | 101377469 B | * | 5/2011 |
| CN | 206399905 U | * | 8/2017 |

(Continued)

OTHER PUBLICATIONS

CN-101377469-B—English (Year: 2011).*

(Continued)

*Primary Examiner* — Daniel S Larkin
*Assistant Examiner* — Fatemeh Esfandiari Nia
(74) *Attorney, Agent, or Firm* — Mannava & Kang, P.C.

(57) ABSTRACT

A gas leak detector cartridge includes a cartridge housing that is removably installed in a handheld device. The cartridge housing includes a sensor that detects a presence of a contaminant in a sample gas and is connected to a printed circuit board. The cartridge housing also includes a pump positioned in a manifold and introduces a sample gas to the sensor. The sensor is at least partially inserted into the manifold that includes the pump.

19 Claims, 10 Drawing Sheets

(56) References Cited

U.S. PATENT DOCUMENTS

| | | | |
|---|---|---|---|
| 2018/0087815 A1 | 3/2018 | Kujak et al. | |
| 2019/0227094 A1* | 7/2019 | Golly | G01F 1/46 |
| 2020/0187560 A1* | 6/2020 | Trzecieski | A24F 40/48 |

FOREIGN PATENT DOCUMENTS

| | | | |
|---|---|---|---|
| CN | 208568172 U | 3/2019 | |
| CN | 208721341 U | 4/2019 | |
| CN | 110440147 A | 11/2019 | |
| JP | 2013083573 A * | 5/2013 | G01M 3/16 |

OTHER PUBLICATIONS

CN-206399905-U—English (Year: 2017).*
JP-2013083573-A—english (Year: 2013).*
"International Search Report and Written Opinion, PCT Application No. PCT/US2021/051546", dated Jan. 13, 2022, 8 pages.

* cited by examiner

GAS LEAK DETECTOR CARTRIDGE

FIELD OF THE INVENTION

The present disclosure relates to a removable gas leak detector cartridge that can be inserted into a handheld device to convert the handheld device into a gas leak detector. In one aspect, the disclosure relates to a gas leak detector cartridge, in which the cartridge containing certain components of the gas leak detector is replaceable by another type of detector cartridge.

BACKGROUND

A gas leak from a flow channel that extends from a gas supply pipeline can result in material loss and can cause or raise possible safety issues. Therefore, it is necessary to regularly perform gas leak tests using a gas leak detector. Presently, if a user needs a flow meter and a gas leak detector, the user will need to purchase a flow meter and a separate device that is capable of detecting a gas leak. Thus, there is a need to have a single handheld device that can be converted from one type of detector, such as a flow meter to another type of a detector, such as a gas leak detector.

SUMMARY OF THE INVENTION

In an aspect, a gas leak detector cartridge includes a cartridge housing removably installed in a handheld device. The cartridge housing can include a sensor disposed therein that detects a presence of a contaminant in a sample gas and wherein the sensor is electrically connected to a printed circuit board. The cartridge housing also includes a pump that introduces the sample gas to the sensor, wherein the sensor is at least partially inserted into a manifold that includes the pump.

In another aspect, the sensor in the gas leak detector cartridge detects the presence of a contaminant in the sample gas by measuring a voltage change due to the change in resistance of the heated resistor caused by heat exchange between the heated resistor and the sample gas having the contaminant.

In a further aspect, the gas leak detector cartridge further includes a gas leak sniffing probe, without having a reference gas inlet, in fluid communication with the pump.

In yet another aspect, the gas leak sniffing probe includes a replaceable mesh filter.

In an aspect, the gas leak sniffing probe includes a push-in retaining ring.

In another aspect, the gas leak sniffing probe includes a protective outer tube and an inner tube.

In a further aspect, the protective outer tube includes at least polyurethane and the inner tube includes at least fluorinated ethylene propylene.

In yet another aspect, the pump is a microblower.

In another aspect, the gas leak detector includes a single gas inlet in fluid communication with the pump.

In an aspect, a convertible handheld device includes a receptacle that removably receives the gas leak detector cartridge.

In another aspect, a convertible handheld device includes (i) a receptacle that removably receives a cartridge and (ii) a code receiver that receives a code from the received removable cartridge to determine if the received removable cartridge is a genuine removable cartridge.

In a further aspect, the cartridge includes a first electrical connector and the handheld device includes a second electrical connector, wherein when the removable cartridge is inserted into the receptacle, the first electrical connector electrically connects to the second electrical connector and the handheld device requests the removable cartridge to provide the code.

In yet another aspect, the removable cartridge includes an electrical erasable programmable read-only memory (EEPROM) having an identification/authentication code and the handheld device includes an EEPROM code reader to authenticate the removable cartridge.

In an aspect, the handheld device further includes an electronic circuit comprising at least a processor and a memory that receives a signal from the cartridge. The handheld device includes a user-operable buttons that provides an input to the electronic circuit. The handheld device includes an electrical power source disposed in the handheld device. The handheld device also includes a display screen that illustrates data received and generated by the cartridge.

In another aspect, the cartridge is a flow meter, a gas leak detector, a temperature sensor, a pressure sensor, a pH meter, or a chemical sensor.

In a further aspect, the code further provides the handheld device with a function of the cartridge.

In yet another aspect, a method for detecting a contaminant in a sample gas by first measuring a reference voltage generated by the sensor due to the thermal conductivity caused by contacting the sample gas without the contaminant to the sensor, storing the reference voltage in a memory, contacting a sample gas containing a potential contaminant to the sensor, determining a measured voltage generated by the sensor due to the thermal conductivity caused by contacting the sample gas with the potential contaminant to the sensor, and comparing the reference voltage to the measured voltage (sample gas plus contaminant) to detect an existence of the contaminant.

In an aspect, the method for detecting a contaminant in a sample gas further includes sending the difference between the reference voltage and the measured voltage to EEPROM to determine flow rate of the contaminant being leaked.

In another aspect, the EEPROM includes a concentration lookup table.

In a further aspect, the sample gas without the contaminant and the sample gas with potential contaminant is contacted to the sensor at a substantially similar flow rate.

In yet another aspect, the flow rate is from about 7 mL/min to about 15 mL/min.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

DRAWINGS

The same part numbers designate the same or similar parts throughout the figures.

DESCRIPTION

Figure 1:
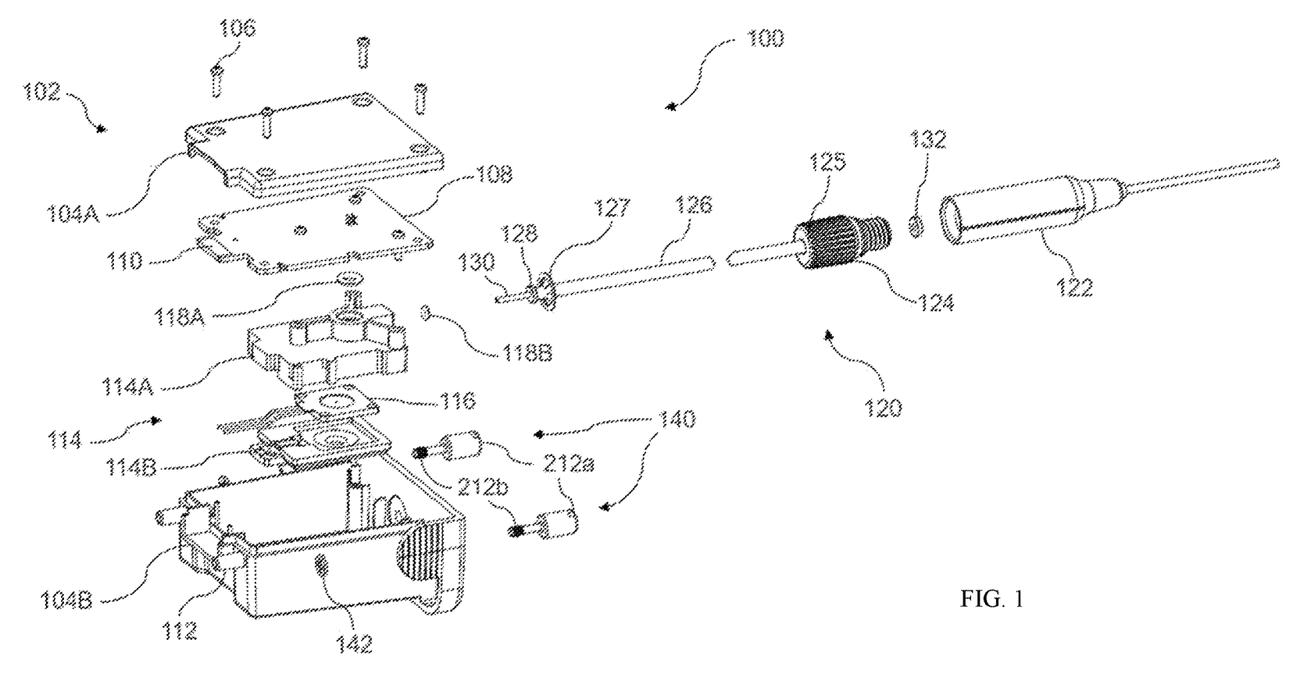
FIG. 1 is an explosive view of a gas leak detector cartridge, according to an example.

FIG. 1 is an explosive view of a gas leak detector cartridge 100, according to an example. As shown in FIG. 1, the gas leak detector cartridge 100 may include a shape and dimensions that can be inserted into a receptacle 208 (shown in FIG. 9) of a handheld device 226 (also shown in FIG. 9). The gas leak detector cartridge 100 includes a cartridge housing 102 having a cartridge lid 104A and a cartridge base 104B. The cartridge lid 104A and the cartridge base 104B may be secured together by any methods and devices known to one skilled in the art. For example, the cartridge lid 104A and the cartridge base 104B may be secured to one another by an adhesive, one or more fasteners, such as clips, or screws 106, as shown in FIG. 1. The cartridge housing 102 may include at least one or more cartridge components, examples of which are described below. For example, the cartridge housing 102 may include a printed circuit board (PCB) 108, a manifold 114, and at least a portion of a gas leak sniffing probe 120. The PCB 108 may be formed of a rectangular plate, on which a sensor 144 (shown in FIG. 4) is mounted at a certain position on its underside. The PCB 108 may include a first electrical connector 110 that is located at one end of the PCB 108. The PCB 108 may be mounted on the manifold 114 and may be sealed using a sensor O-ring 118A. In an example, the manifold 114 may be in a form of a clam shell that includes a top manifold cover 114A and a bottom manifold cover 114B. The manifold 114 may include a pump, such as a microblower 116 that introduces a sample gas into the cartridge housing 102 by creating a negative pressure. The manifold 114 may also include a portion or an end of the gas leak sniffing probe 120, which is used by the microblower 116 to draw the sample air and introduce it into the cartridge housing 102, and at least a portion of the sensor 144 that extends out of or away from the PCB 108.

As shown in FIG. 1, the gas leak sniffing probe 120 is in fluid communication with the microblower 116 to draw the sample air and introduce it into the sensor 144. The gas leak sniffing probe 120 may include a female portion 122, a male portion 124, and a removable/replicable/serviceable filter, such as mesh filter 132 interposed therebetween that filters the particles or dusts in the sample gas introduced into the gas leak sniffing probe 120. One end of the male portion 124 may be threaded such that it can be removably attached to the female portion 122. The gas leak sniffing probe 120 may also include a protective outer tube 126 and an inner tube 130. The inner tube 130 is long enough to extend the length of the protective outer tube 126. A sniffer O-ring 118B fits around to the inner tube 130 and is used to seal the connection between the gas leak sniffing probe 120 and the manifold 114 in the cartridge housing 102. A ferrule tube retainer 128 is positioned to secure the inner tube 130 with the protective outer tube 126 in place. Additionally, a push-in retaining ring 127 is used to improve the pull force and to further secure the gas leak sniffing probe 120 to the manifold 114. A micro O-ring 125 placed inside of the male portion 124 is used to maintain the seal between the protective outer tube 126 and the inner tube 130. The protective outer tube 126 may be made of a plastic material, for example, polyurethanes, and the inner tube 130 may also be made of a plastic material, for example, fluorinated ethylene propylene copolymers. It may be readily understood that the gas leak sniffing probe 120 can be flexible, semi-rigid, or rigid.

Figure 2:
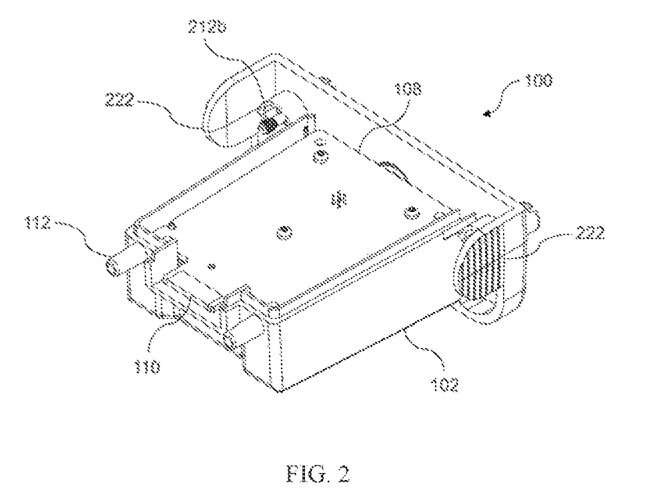
FIG. 2 is a front-side perspective view of the gas leak detector cartridge of FIG. 1, according to an example.
Figure 8:
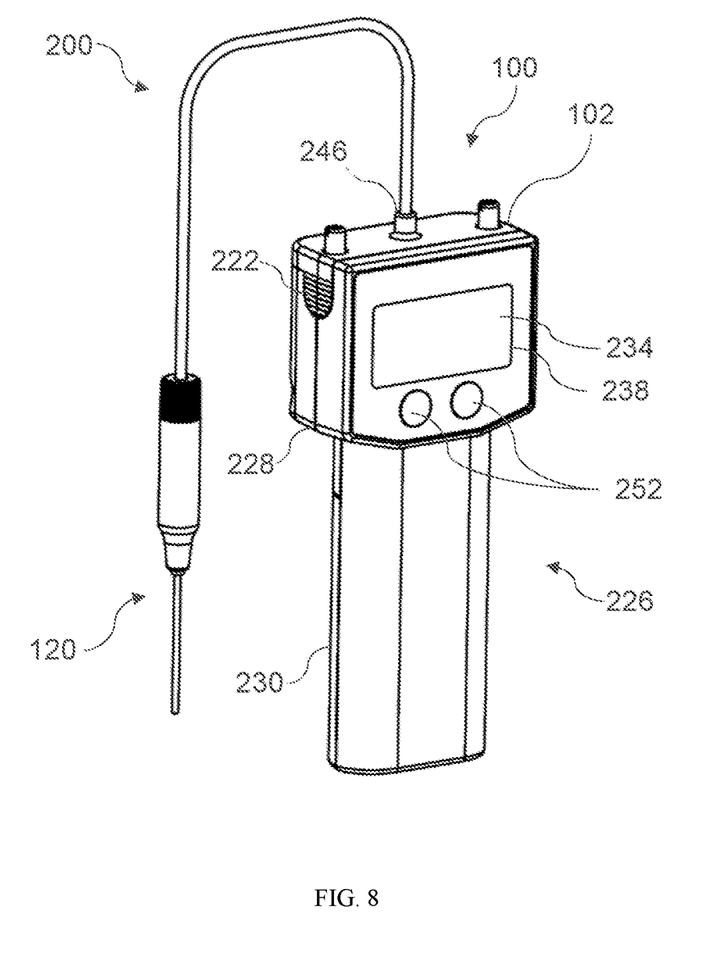
FIG. 8 is a front perspective view of a handheld device having a gas leak detector cartridge inserted therein, according to an example.

In an example, as shown in FIGS. 1 and 2, the cartridge base 104B may include one or more guide members 112 and one or more fasteners that enable a user to fasten the gas leak detector cartridge 100 to a handheld device 226 (shown in FIG. 8). As shown in FIG. 1, each of the fasteners can include washers 142 and corresponding thumbscrews 140 for removably engaging or coupling the gas leak detector cartridge 100 with the handheld device 226. Each of the thumbscrews 140 may further include a head member 212a and an engagement member 212b.

FIG. 2 is a front-side perspective view of the gas leak detector cartridge 100 of FIG. 1, according to an example. In an example, the first electrical connector 110 may be arranged at one end of the PCB 108 and is accessible via an opening of the gas leak detector cartridge 100. Various internal cartridge components may be mounted to or at least communicate with the PCB 108. As discussed above, the gas leak detector cartridge 100 may include one or more thumbscrews 140 for removably engaging or coupling with one or more second engagement members (not shown) of the handheld device 226 (shown in FIG. 9). To assist in handling the gas leak detector cartridge 100 during installation and uninstallation, the gas leak detector cartridge 100 may include one or more contact sections 222 configured (i.e., sized and positioned) to be contacted by a user's finger or thumb. In some examples, fasteners such as, for example, screws may be used to lock the gas leak detector cartridge 100 in place.

Figure 3:
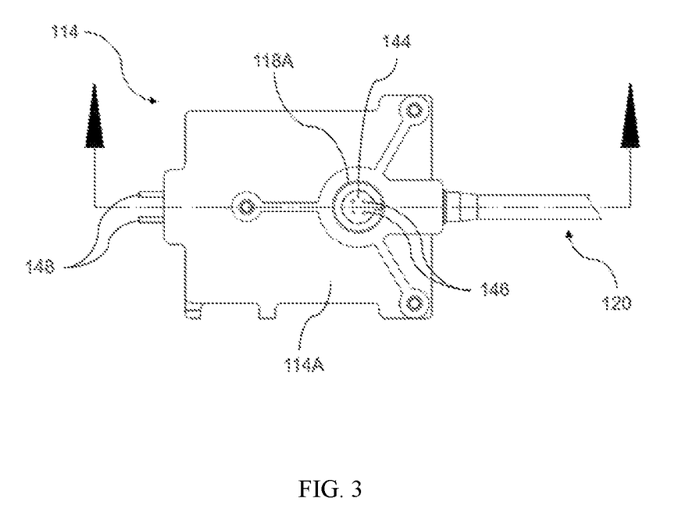
FIG. 3 is a front view of a manifold and a portion of the gas leak sniffing probe, according to an example.
Figure 4:
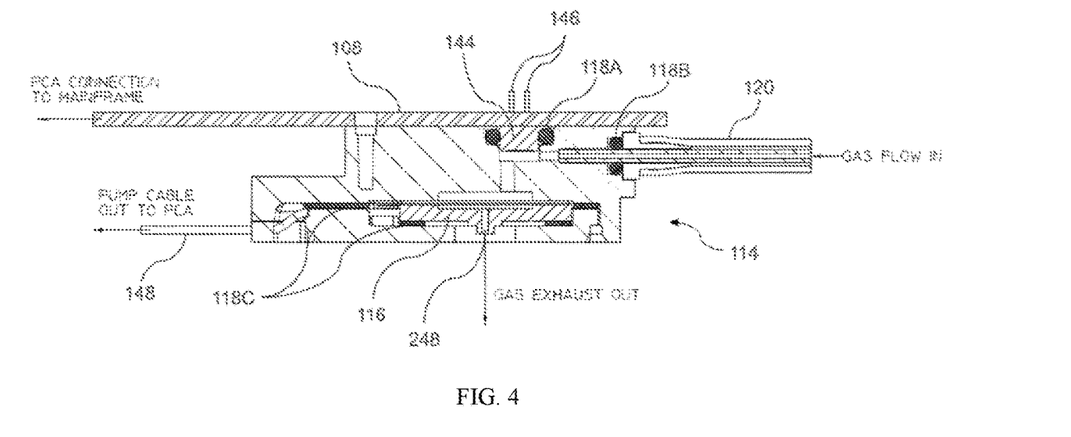
FIG. 4 is a cross-sectional view of FIG. 3, according to an example.

Referring to FIGS. 3 and 4, the manifold 114 may include the microblower 116 (shown in FIG. 4), the PCB 108, and the sensor 144, according to an example. The sensor 144 is placed on the top manifold cover 114A, and the sensor O-ring 118A may be used to seal the connection between the sensor 144 and the top manifold cover 114A. The sensor 144 may include at least four sensor connectors 146 that are electrically connected to the PCB 108. The sensor 144 may be mounted on the underside of the PCB 108 and is at least partially inserted into a recessed portion of the manifold 114. The sniffer O-ring 118B provides a leak-free direct connection between the gas leak sniffing probe 120 and the manifold 114. During operation, the microblower 116 can move the sample gas through the gas leak sniffing probe 120 into the manifold 114, such that the sample gas can come in contact with at least one portion of the sensor 144 prior to the sample gas being exhausted out. The microblower 116 may be shaped like a flat box, and seals 118C may be used between the manifold 114 and the microblower 116 so that the microblower 116 is leak proof and secure during operation. The microblower 116 of this example is a piezoelectric type diaphragm pump in which a diaphragm is vibrated at a high frequency by a piezoelectric element to activate a pumping operation, thereby causing a sample gas to be drawn into and discharged from the microblower 116. In an example, the microblower 116 is a piezoelectric driven pump. By using a piezoelectric driven pump instead of a direct-current motor driven pump, the size and weight of the microblower 116 may be decreased and at the same time its lifespan may be increased. When the microblower 116 is arranged integrally in the vicinity of the sensor 144 by means of the manifold 114, the dimensions and weight of the cartridge housing 102 may be correspondingly expected to be reduced. During operation, a fluid flow is created by the negative pressure of the microblower 116, which is connected electrically to the PCB 108 in the cartridge housing 102 using at least two wires 148. The microblower 116 may be a low flow rate microblower and may only require a small volume of fluid to flow therethrough. For example, the volume of the fluid going through the microblower 116 can be from about 1 mL/min to about 30 mL/min, such as from about 7 mL/min to about 15 mL/min, for example, 11 mL/min. The low flow rate increases the sensitivity of the detector by causing the concentration of the contaminant in proportion to air be higher. Moreover, the small diameter of the inner tube 130 may reduce the time it takes the sample gas and the contaminant, if any, to reach the sensor 144. This time reduction can result in the detector having quicker response time.

Figure 5:
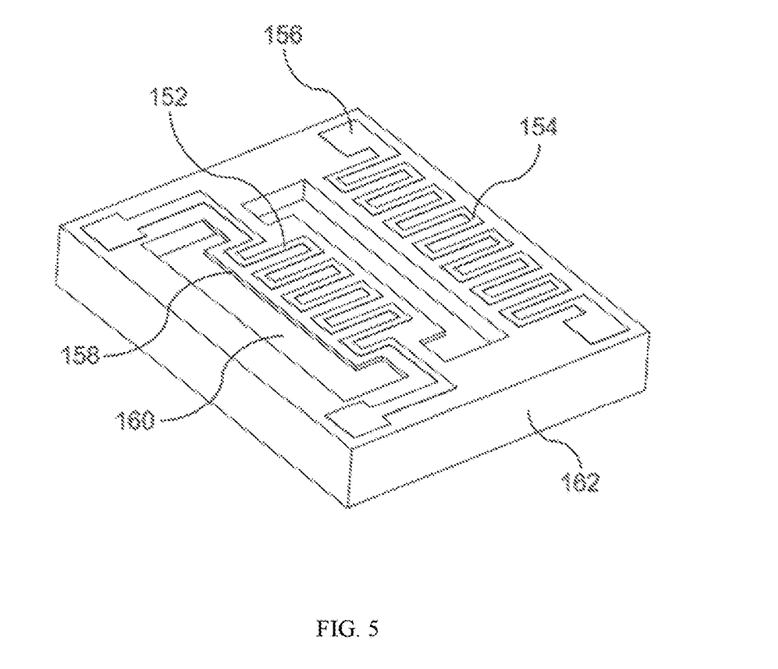
FIG. 5 is a gas sensor, according to an example.

FIG. 5 illustrates the structure of the gas sensor 144, which can be purchased from Posifa Technologies, located in Ca, USA, according to an example. In order to detect a contaminant in a sample gas that comes in contact with the gas sensor 144, a processor measures voltage difference caused by minute changes in resistance of a heated element resulting from the temperature change due to heat transfer from the heated element to the sample gas and potential contaminant. To detect the voltage difference, the sensor 144 may include a micro-machined cavity 160 with a flat bottom and an arbitrary plane shape. The cavity 160 may be created in a silicon substrate 162; however, other types of substrates may also be used. The sensor 144 may also include a heated element in a form of a heated resistor 152, which can be a platinum thin-film resistor. The sensor 144 also includes a reference resistor 154 of the same Thermal Coefficient of Resistance as the heated resistor 152 for ambient temperature compensation. Bonding pads 156 are arranged on one side of the silicon substrate 162, allowing for more efficient packaging. The heated resistor 152 may be located on a thermal insulating membrane 158. The thermal insulating membrane 158 may be suspended over the cavity 160 that has a bottom surface parallel to the thermal insulating membrane 158. The thermal insulating membrane 158 ensures an independent response to a temperature change, (e.g., temperature drop) due to the heat transfer caused by the passing of the sample gas having a contaminant as compared to the reference resistor 154. Due to the minute volume of the gas measured (i.e., the volume within the cavity), the sensor 144 can deliver ultra-low power consumption and fast response time. When the sample gas having a contaminant comes in contact with the sensor 144, the thermal conductivity of the gas changes accordingly. The change in thermal conductivity causes the temperature of the heated resistor 152 to change (e.g., the heated resistor 152 cools) at a different rate from the reference resistor 154, thereby causing the processor to detect a voltage difference. This voltage difference signifies that a contaminant is present in the sample gas. By this voltage difference we can qualitatively detect the amount of contaminants (leak) in the sample gas. For example, a convertible leak detector 200 (shown in FIG. 8) can include levels 1-8, wherein level 1 may correspond to a small leak, such as a leak of about 0.003 ml/min or less and level 8 may correspond to a large leak, such as a leak of about 0.03 ml/min or more.

Figure 6:
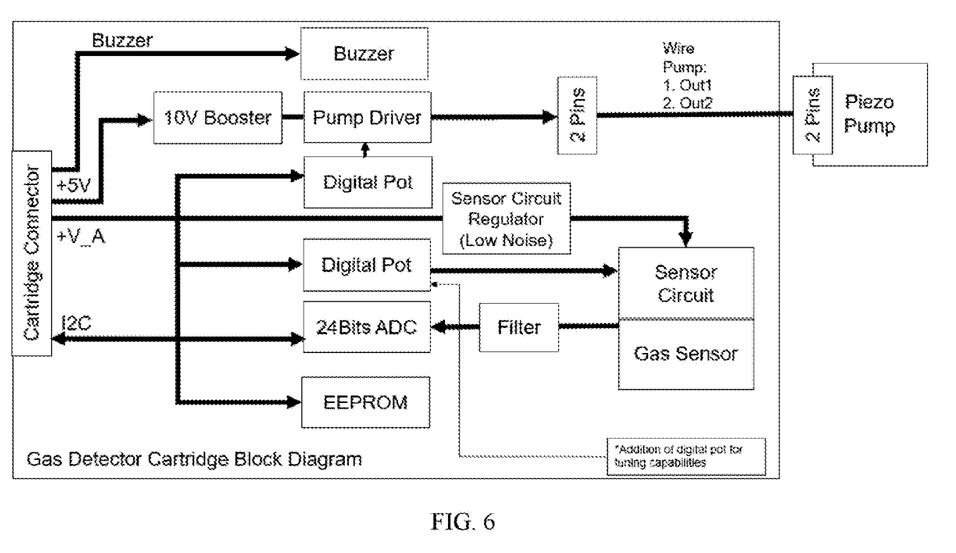
FIG. 6 is a block diagram of electronic architecture of a PCB in the gas leak detector cartridge, according to an example.

FIG. 6 is a block diagram of electronic architecture of a PCB 108 in the gas leak detector cartridge 100, according to an example. The gas leak detector cartridge 100 includes five major functions, i.e., a buzzer, a piezo pump controller, a Sensor circuit, an analog to digital converter (ADC), and an electrically erasable programmable read-only memory (EEPROM). If the amount of the contaminant (i.e., leaked gas) is greater than or equal to a certain value, the buzzer is caused to make an audible alarm sound. The users can turn on and off the buzzer function at the mode setting page. The piezo pump has a wide range of operation voltage from 5 volts to 20 volts. In order to have a consistent flow rate, a digital potentiometer is added to manually tune the piezo pump flow rate from 9.0 mL/min to 10.0 mL/min during calibration. The tuning process only happens during calibration. The Sensor circuit that is connected with the sensor 144 drifts over time, which may cause the measurement voltage to be out of the ADC detection range. Therefore, a pair of resistors RDAC1 and RDAC2 from the digital potentiometer are added parallel to discrete resistors R1 and R2 disposed on the PCB 108, which may allow fine tunings on the total equivalent resistance. Tunings on RDAC1 and RDAC2 can be automatically performed via an I2C digital interface on every power-on cycle so as to ensure the measurement voltage within the detection range. The analog voltage from the Sensor circuit may be connected to an analog filter to remove the high frequency signal. The signal may then fed into the ADC to perform a conversion from an analog voltage to a digital signal. After conversion, the ADC may send out a series of digital signals via the I2C digital interface to the handheld device 226 (shown in FIG. 8) through the connection between the first electrical connector 110 in the gas leak detector cartridge 100 and the second electrical connector 354 (shown in FIG. 12) in the handheld device 226 (shown in FIG. 8). The EEPROM may be used to store a series of information, for example, the gas leak detector a concentration table, a code, such as an authentication code, the cartridge series number, the cartridge part number, the activation date, the sniffing probe filter replacement date, the user setting features, the manufacturer of the gas leak detector cartridge 100 (i.e., confirmation that the gas leak detector cartridge 100 is not a knock-off), etc.

Figure 7:
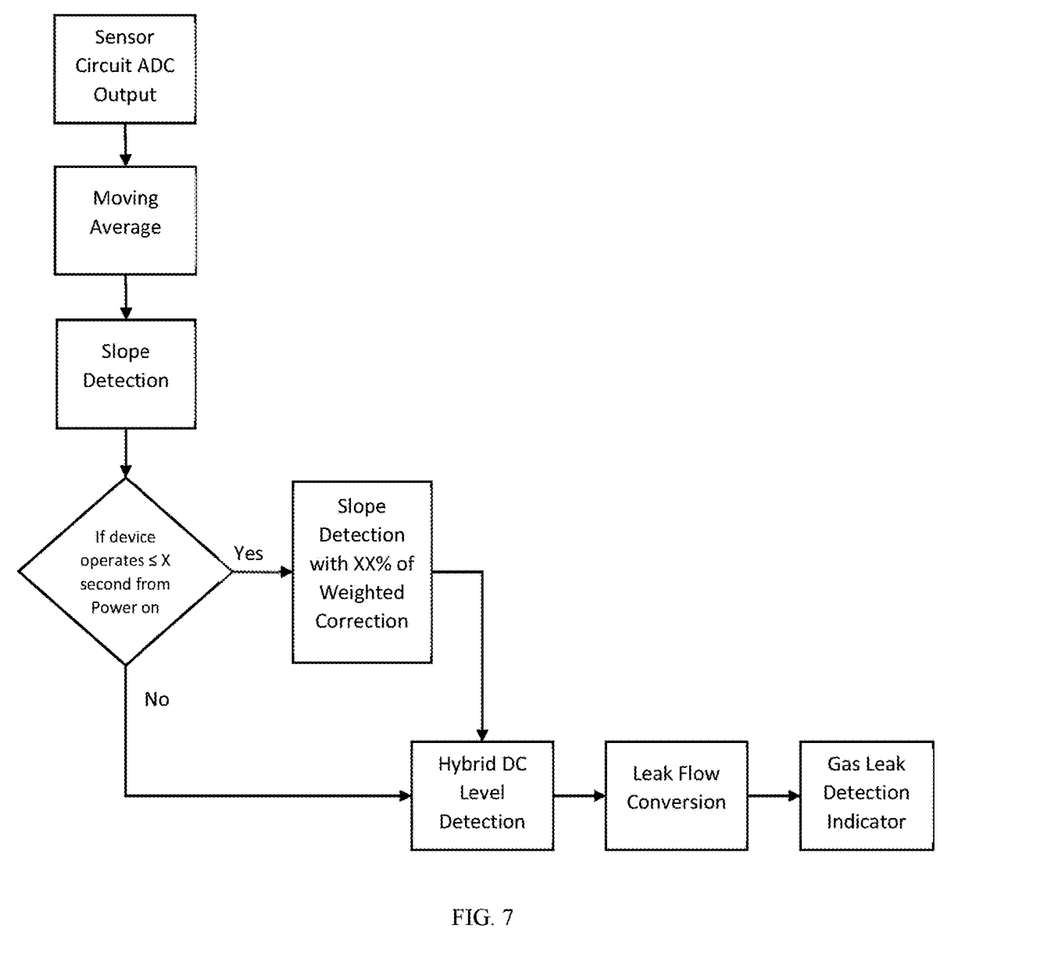
FIG. 7 is a flowchart showing the process for detecting a leaked gas using a gas leak detector, according to an example.

FIG. 7 is a flowchart showing the process for calculating a leaked gas level using a convertible detector 200, which is the combination of the gas leak detector cartridge 100 and the handheld device 226 (shown in FIG. 8), according to an example. Firstly, the sensor circuit output is periodically captured from the ADC integrated circuit via a communication interface, such as an I2C communication interface. Moving average is then calculated to reduce the incoming noise with a formula shown below:

$$\text{Moving Average}_{current} = \frac{1}{n}\sum_{i=0}^{n-1}(S_{M-i})$$

In an example, after the moving average has been determined, a slope detection algorithm, shown below, may be used to obtain a rate of change from the Sensor voltage output, which is the voltage difference over time, as shown below:

$$\text{Slope Detection} = \frac{\Delta \text{Voltage}}{\Delta \text{Time}}$$

$$\text{Slope Detection} = \frac{V_{current} - V_{Previous}}{\Delta \text{Time}}$$

In one example, the difference of the Sensor voltage output may be from 0 sec. to 250 sec. During this period, the gas leak sniffing probe 120 may be moved 16 times into and out of a 0.03 mL/min helium leak source. The output voltage may be a voltage difference at the time when the gas leak sniffing probe 120 moved in and was removed from the gas leak source. During this 250 sec. the Sensor output may be drifted from 0.014 V down to −0.01V. The slope detection may be calculated to compensate for the heat from the sensor 144 that produces the drift over time. A negative peak indicates a gas leak, and the magnitude of the peak measures a gas leak rate.

As shown in FIG. 7, in an example, a warmup algorithm may be implemented when the convertible detector 200 has been turned on for less than a predetermined time. For example, if the convertible detector 200 has been turned on for less than 500 seconds, such as less than 300 seconds, for example, less than 200 seconds, or less than 150 seconds. The warmup algorithm shortens sensor settling time and increases the accuracy of gas leakage detection during this predetermined period. The warmup algorithm can generally be illustrated as follows:

Warm up algorithm $(t_1)$=Slope detection $(t_1)$−[correction factor], where $t_1$ from 0 second to predetermined time in seconds Furthermore, in order to read out the voltage difference of the drifted output, a hybrid DC Level detection method may be utilized, which calculates the sum of areas under each of slope detection.

In an example, two threshold limits may trigger the calculation of a Hybrid DC value, i.e., a lower limit when the slope detection is less than −0.00× and an upper limit when the slope detection is more than +0.00×. When the gas leak sniffing probe 120 moves into a gas leak source, the slope detection curve is less than −0.00×. The Hybrid DC value can be calculated as below:

$$\text{Hybrid DC Level} = \text{Integration of Slope Detection}$$

$$= \int_{t1}^{t2} \left[\frac{\Delta v}{0.05}\right] dt$$

$$= \text{Sum of area under slope detection}$$

$$= \sum_{t1}^{t2} \frac{\Delta v}{0.05} * 0.05$$

$$= \sum_{t1}^{t2} \Delta v$$

The above Hybrid DC value $\sum_{t1}^{t2} \Delta v$ is recorded as +1 Level, wherein t1 is where slope detection for the sensor output starts and t2 is where slope detection for the sensor output ends.

When the gas leak sniffing probe 120 is removed from the gas leak source, the slope detection curve is more than +0.00×. Similarly, the above Hybrid DC value $\sum_{t3}^{t4} \Delta v$ is recorded as −1 Level, wherein t3 is where slope detection for the sensor output starts and t4 is where slope detection for the sensor output ends.

The calibration process in the factory can be accomplished individually at level 1, level 3, and level 5. In one example, the Hybrid DC value for level +1, level −1, level +3, level −3, level +5, and level −5 is recorded, respectively.

Then, a curve fitting $2^{nd}$ order polynomial equation based on level +1, level −1, level +3, level −3, level +5, and level −5 is generated to obtain equation constants for the calibration curve at the positive level and at the negative level, respectively. After obtaining equation constants, a calibration level lookup table is created based on the level threshold.

The calibration level lookup table may be programmed into the EEPROM and the data is encrypted. On every power-on cycle, the convertible detector 200 may load the calibration level lookup table, which may ensure the handheld device 226 (shown in FIG. 8) to reflash the memory with accurate value. During normal operation, the convertible detector 200 displays the gas leak level in a display screen 234 (shown in FIG. 8) of the handheld device 226 (shown in FIGS. 8 and 9).

Figure 9:
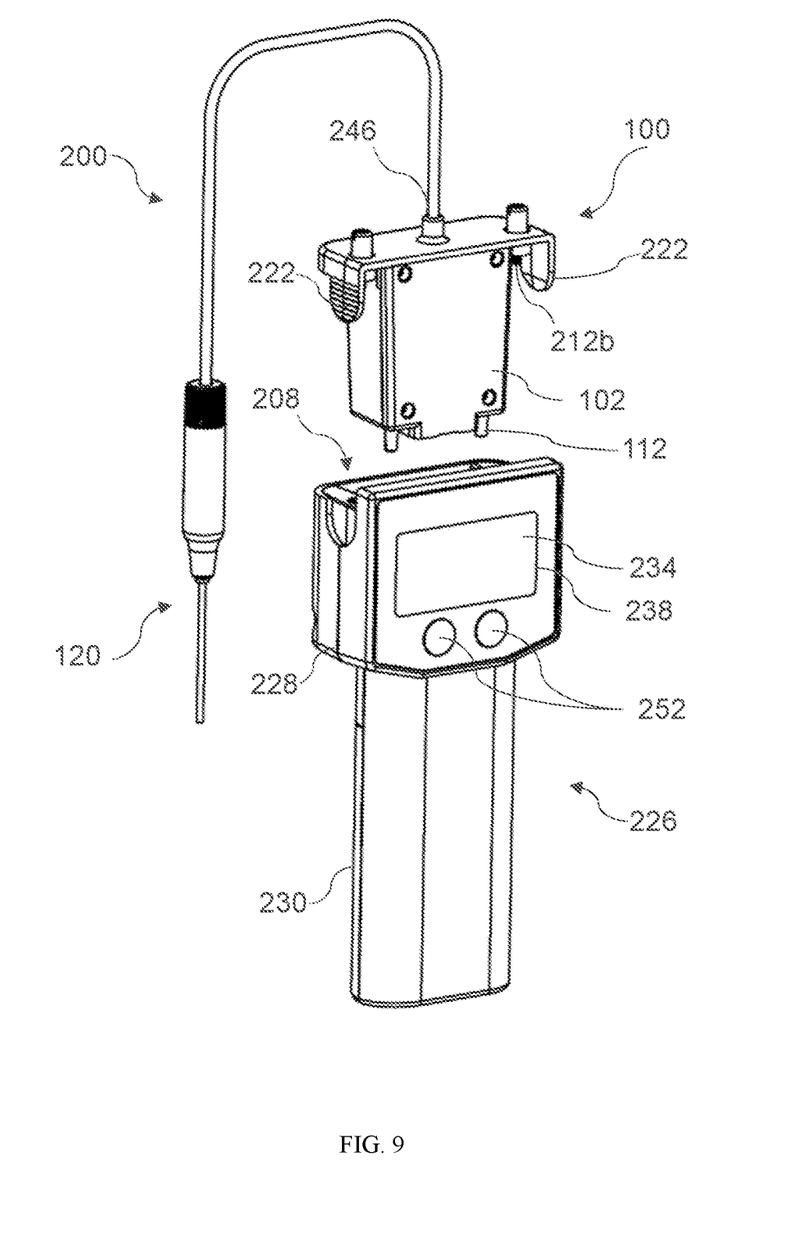
FIG. 9 is another front perspective view of the handheld device of FIG. 8, showing the gas leak detector cartridge uninstalled (removed) from a receptacle in the handheld device, according to an example.

FIG. 8 is a front perspective view of the convertible detector 200 having a gas leak detector cartridge 100 inserted therein, according to an example. The convertible detector 200 may include a handheld device 226 and a gas leak detector cartridge 100 for removable installation in the handheld device 226. FIG. 8 illustrates the gas leak detector cartridge 100 in an installed, operational position in the handheld device 226. FIG. 9 is another front perspective view of the convertible detector 200, showing the gas leak detector cartridge 100 uninstalled (removed) from the handheld device 226. In the present example, the handheld device 226 includes a receptacle 208 for receiving the gas leak detector cartridge 100. The modular configuration of the convertible detector 200 enables a user to replace the gas leak detector cartridge 100 with another type of a modular detector cartridge, such as a modular flow rate detector. The removable cartridge may be selected from a group, but is not limited to, comprising a flow meter, a gas leak detector, a temperature sensor, a pressure sensor, a pH meter, a chemical sensor, etc. The gas leak detector cartridge 100 may include a code from the EEPROM, and the handheld device 226 may further include an EEPROM code reader to determine or authenticate the received gas leak detector cartridge 100 is a genuine cartridge. In an example, the EEPROM code reader of the handheld device 226 may request from the gas leak detector cartridge 100 to provide an authentication code. In another example, the gas leak detector cartridge 100 provide the EEPROM code to the EEPROM code reader of the handheld device 226.

The handheld device 226 and the gas leak detector cartridge 100 may be configured such that the gas leak detector cartridge 100 is retained in the receptacle 208 of the handheld device 226 in a secured or locked, yet removable or releasable, manner. For this purpose, the gas leak detector cartridge 100 may include one or more engagement members 212b (shown in FIG. 9) for removably engaging or coupling with one or more second engagement members (not shown) in the handheld device 226. The gas leak detector cartridge 100 is installed in the handheld device 226 by moving or sliding the gas leak detector cartridge 100 into and through the receptacle 208 until the engagement member 212b engages the second engagement member (not shown) in the handheld device 226. To assist in handling the gas leak detector cartridge 100 during installation and uninstallation, the gas leak detector cartridge 100 may include one or more contact sections 222 configured (i.e., sized and positioned) to be contacted by a user's finger or thumb. In some examples, the gas leak detector cartridge 100 may also include one or more guide members 112 configured for removably engaging one or more second guide members (not shown) in the handheld device 226. In some embodiments, fasteners such as, for example, screws may be used to lock the gas leak detector cartridge 100 in place.

As also shown in FIG. 8 and FIG. 9, the handheld device 226 may include a housing that includes a first section 228 and a second section 230 as described herein. The handheld device 226 also includes a display screen 234 that illustrates data received and generated by the removable gas leak detector cartridge 100 and user-operated buttons 252 that provide an input to the electrical circuit as described herein. The display screen 234 may be framed or surrounded by an opening 238 formed in the first section 228. The display screen 234 may be flush with or recessed in the opening 238. The display screen 234 is able to show the type of the received cartridge 100.

The gas leak detector cartridge 100 may include a cartridge housing 102. The gas leak detector cartridge 100 further includes a fluid inlet (or cartridge inlet) 246 (shown in FIG. 8) and a fluid outlet (or cartridge outlet) 248 (shown in FIG. 4), and the fluid inlet 246 may be configured for coupling with the gas leak sniffing probe 120. The sample gas is introduced into the fluid inlet 246 through the gas leak sniffing probe 120 and is exhausted out of the fluid outlet 248, thereby providing a flow path during the detector operation.

One example of a method for operating a convertible detector 200 will now be described with the understanding that the example does not limit the broadest aspects of the subject matter disclosed herein. The method includes installing a cartridge in a handheld device 226 to make the handheld device 226 act as a gas leak detector such that a first electrical connector of the cartridge is coupled to a second electrical connector of the handheld device. The cartridge and the handheld device may be configured according to any of the examples disclosed herein. In some examples, the method includes installing the cartridge by moving the cartridge into a receptacle of the handheld device as described herein. In some examples, the method includes engaging the cartridge with the handheld device in a manner that assists in retaining the cartridge in the proper installed position in the handheld device, such as in a locked or secured manner, as described herein. In some examples, the method includes uninstalling one type of detector cartridge from the handheld device and installing another type of detector cartridge in the handheld device as described herein.

Another example of a method for operating a convertible detector 200 includes installing a cartridge in a handheld device 226 to make the handheld device act as a gas leak detector by moving the cartridge into a receptacle of the handheld device and coupling a first electrical connector of the cartridge with a second electrical connector of the handheld device. A sample gas without the contaminant (i.e., a reference gas) is introduced through a cartridge inlet to the gas sensor 144. A processor measures a reference voltage based on the heat exchange between the reference resistor 154 and the uncontaminated sample gas. The reference voltage may be stored in a memory. If a sample gas having a contaminant is introduced through the cartridge inlet to the sensor, then the processor measures a voltage caused by the change in resistance of heated resistor 152 due to a temperature change (i.e., cooling effect) caused by heat exchange between the heated resistor 152 and the sample gas having the potential contaminant. The processor can then determine the voltage difference between the reference voltage and the measured voltage. The voltage difference, if any, signifies that a contaminant is present in the sample gas. The voltage difference may also be sent to an EEPROM, which may include a concentration table, to qualitatively detect the leak rate. This leak rate may be displayed in a form of levels 1-8 on the display 234.

Figure 10:
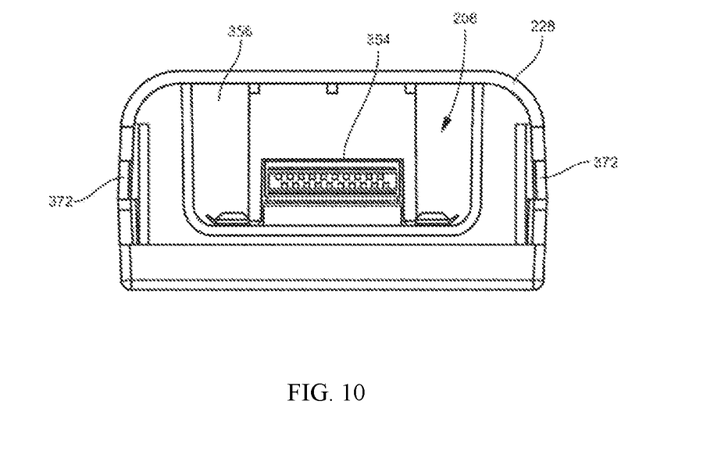
FIG. 10 is a top view of a handheld device, without the gas leak detector cartridge, according to an example.

FIG. 10 is a top view of a handheld device 226, i.e., looking down into the receptacle 208, according to an example. The handheld device 226 includes a second electrical connector 354 for removable coupling with the first electrical connector 110 (shown in FIG. 1) in the gas leak detector cartridge 100 (also shown in FIG. 1). The first electrical connector 110 is coupled to the second electrical connector 354 when the gas leak detector cartridge 100 is in the installed position (shown in FIG. 8), and is decoupled or uncoupled from the second electrical connector 354 when the gas leak detector cartridge 100 is in the uninstalled position (shown in FIG. 9). The second electrical connector 354 may be positioned at or proximate to the receptacle 208. Generally, the first electrical connector 110 and the second electrical connector 354 may have any configuration suitable for providing an electrical interconnection when coupled together, as described above in conjunction with FIG. 1.

As also shown in FIG. 10, the handheld device 226 may include an interior wall 356 disposed between the receptacle 208 and the handheld device interior (e.g., the interior enclosed by the second section 230 of the main housing). The interior wall 356 serves as the base or floor of the receptacle 208. The second electrical connector 354 may be positioned at or proximate to the interior wall 356. The interior wall 356 may partition or provide a boundary between the receptacle 208 and the handheld device interior. As described above, this boundary may or may not be fluid-tight. FIG. 10 also illustrates one or more spaces or openings 372 at the top of the handheld device 226, and on the inside of an outer wall of the first section 228 of the main housing (shown in FIGS. 8 and 9). The engagement members 212b (shown in FIG. 9) of the gas leak detector cartridge 100 described above may be inserted into the space(s) 372 and into engagement with corresponding second engagement member(s) (not shown) located in the space(s) 372.

Figure 11:
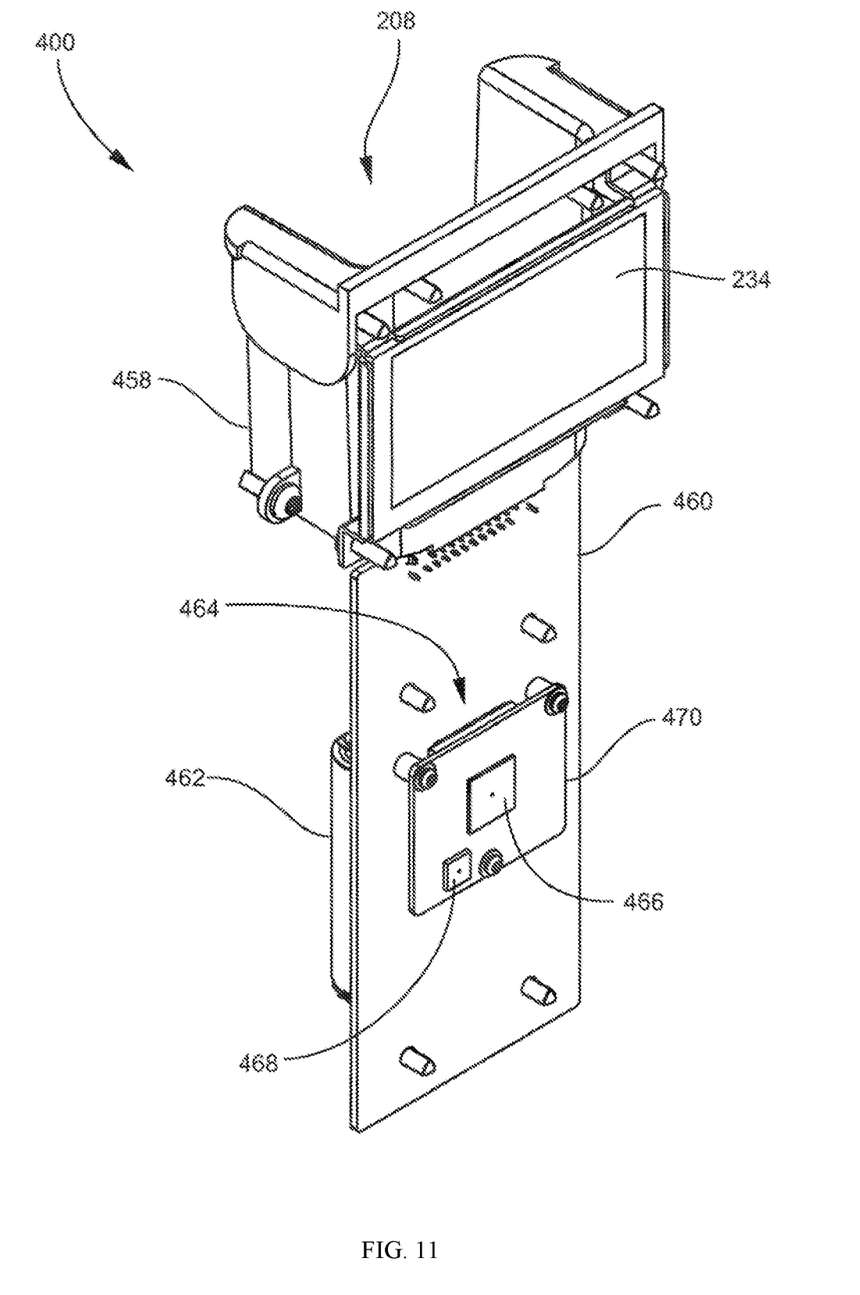
FIG. 11 is a front perspective view of an internal assembly of the handheld device, according to an example.
Figure 12:
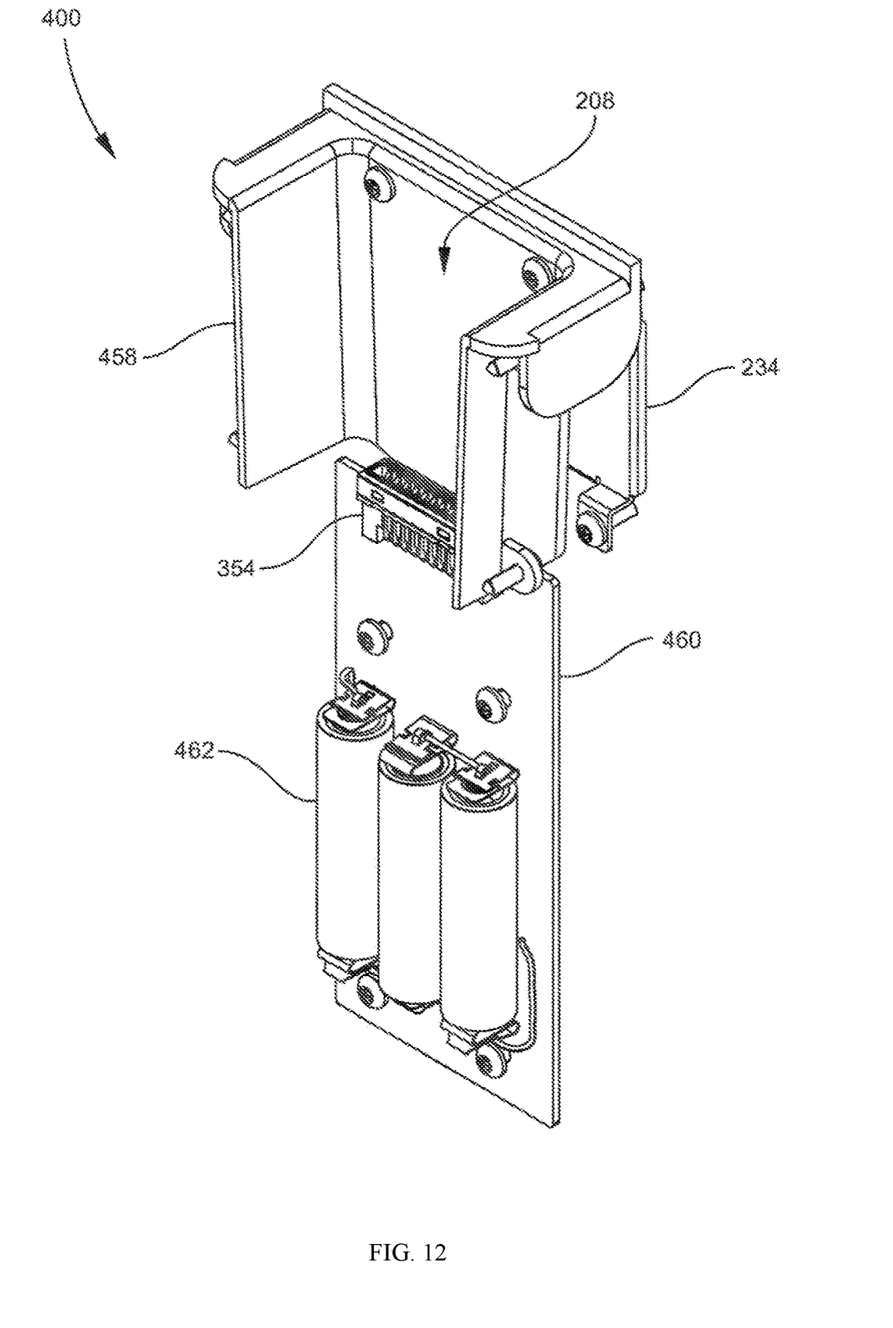
FIG. 12 is a rear perspective view of the internal assembly illustrated in FIG. 11, according to an example.

FIG. 11 is a front perspective view of an internal assembly 400 of the handheld device 226 that may be included in the handheld device 226, according to an example. FIG. 12 is a rear perspective view of the internal assembly 400. In the illustrated example, the internal assembly 400 may include the display screen 234 mounted to a support structure 458 (which at least partially defines the receptacle 208), the second electrical connector 354 mounted to or communicating with a main PCB 460 (or main board, or first circuit board), an electrical power source 462 (e.g., one or more batteries as illustrated, and/or a power connection) mounted to or communicating with the main PCB 460, and an electronic circuit 464 mounted to or communicating with the main PCB 460. When batteries are utilized, the handheld device housing may include an openable or removable access panel (not shown) to facilitate replacement of the batteries. As described above, the electronic circuit 464 may include one or more components for carrying out various electronic functions, such as a main processor 466, one or more memories 468, etc. The electronic circuit 464 may include or be formed on another circuit board, such as control PCB 470 (or control board, or second circuit board), which is mounted to or communicates with the main PCB 460. The circuit board(s) provided in the handheld device 226 (e.g., main PCB 460 and control board 470) may be configured as needed for providing signal communication between the second electrical connector 354 and various electronic components (e.g., the electrical power source 462, electronic circuit 464, etc.).

It will be understood that FIGS. 11 and 12 illustrate merely one example of a configuration of handheld device components that may be included in the handheld device 226, and that many other configurations are possible. The particular types of the components in the handheld device and their arrangement or layout in the handheld device 226 may vary from one example to another. Moreover, the handheld device components may be of the type generally known to persons skilled in the art, and thus their structures, functions, and operations need not be described in detail herein.

The examples described above have an advantage in enabling expansion of the functionality of a gas leak detector into a convertible handheld device by changing the gas leak detector cartridge. Thus, the users can operate a single handheld device for multiple types of measurements, including, but is not limited to, measurements of flow rate, gas leak, temperature, pressure, pH value, chemicals, etc.

The examples above describe a microblower and a sensor that are small and integrated together (by means of a manifold) to reduce the dimensions and weight of a gas leak detector cartridge. The time and cost associated with manufacturing such a gas leak detector can also be reduced. As the microblower only requires a small volume of fluid flow, the diffusion of the sample gas introduced during transportation and the response delay may be reduced. Therefore, the sensitivity and stability of detection can be enhanced.

Additionally, the examples described above are advantageous with respect to maintenance issues. Not only the cartridge and the handheld device are detachable, the sniffing probe can also be removed and replaced when damaged at the factory. Many of the components of the present disclosure are modular, which makes replacement of any one component relatively easy. Therefore, the present disclosure provides a more reliable and cost-effective convertible handheld device.

This disclosure is to be broadly construed. It is intended that this disclosure disclose equivalents, means, systems and methods to achieve the devices, activities and mechanical actions disclosed herein. For each device, article, method, mean, mechanical element or mechanism disclosed, it is intended that this disclosure also encompasses in its disclosure and teaches equivalents, means, systems and methods for practicing the many aspects, mechanisms and devices disclosed herein. Additionally, this disclosure is intended to encompass the equivalents, means, systems, and methods of the use of the device and/or article of manufacture and its many aspects consistent with the description and spirit of the operations and functions disclosed herein. The claims of this application are likewise to be broadly construed.

The description of the inventions herein in their many embodiments is merely exemplary in nature and, thus, variations that do not depart from the gist of the invention are intended to be within the scope of the invention. Such variations are not to be regarded as a departure from the spirit and scope of the invention.

We claim:

1. A gas leak detector cartridge comprising:
   a cartridge housing removably installed in a handheld device and comprising:
   a sensor disposed in the cartridge housing that detects a presence of a contaminant in a sample gas, wherein the sensor is electrically connected to a printed circuit board; and
   a pump positioned in a manifold,
   wherein the pump introduces the sample gas to the sensor, and
   wherein the sensor is at least partially inserted into the manifold that includes the pump to contact the sample gas.

2. The gas leak detector cartridge of claim 1, wherein the sensor detects the presence of the contaminant in the sample gas by measuring a voltage change due to a change in resistance of a heated resistor caused by heat exchange between the heated resistor and the sample gas having the contaminant.

3. The gas leak detector cartridge of claim 1, further comprising a gas leak sniffing probe in fluid communication with the pump.

4. The gas leak detector cartridge of claim 3, wherein the gas leak sniffing probe comprises a replicable filter.

5. The gas leak detector cartridge of claim 3, wherein the gas leak sniffing probe comprises a push-in retaining ring to secure the gas leak sniffing probe to the manifold.

6. The gas leak detector cartridge of claim 3, wherein the gas leak sniffing probe comprises a protective outer tube and an inner tube.

7. The gas leak detector cartridge of claim 6, wherein the protective outer tube includes at least polyurethane and the inner tube includes at least fluorinated ethylene propylene.

8. The gas leak detector cartridge of claim 1, further comprising a single gas inlet in fluid communication with the pump.

9. A convertible handheld device, comprising:
   a receptacle configured to removably receive the gas leak detector cartridge of claim 1.

10. A convertible handheld device comprising:
    a receptacle that removably receives a cartridge that comprises:
    a cartridge housing including a sensor to detect presence of a contaminant in a sample gas; and
    a pump positioned in a manifold to introduce the sample gas to the sensor,
    wherein the sensor and the pump are at least partially inserted into the manifold; and
    a code receiver that receives an authentication code from the received removable cartridge to determine if the received removable cartridge is a genuine removable cartridge.

11. The convertible handheld device of claim 10,
    wherein the cartridge comprises a first electrical connector and the handheld device comprises a second electrical connector, and
    wherein when the removable cartridge is inserted into the receptacle, the first electrical connector electrically connects to the second electrical connector and the handheld device requests the removable cartridge to provide the authentication code.

12. The convertible handheld device of claim 10, wherein the removable cartridge includes an electrical erasable programmable read-only memory (EEPROM) having the authentication code and the handheld device includes an EEPROM code reader to authenticate the removable cartridge.

13. The convertible handheld device of claim 10, wherein the handheld device further comprises:
an electronic circuit comprising at least a processor and a memory that receives a signal from the cartridge;
a user-operable button that provides an input to the electronic circuit;
an electrical power source disposed in the handheld device; and
a display screen that illustrates data received and generated by the cartridge.

14. The convertible handheld device of claim 10, wherein the cartridge is a flow meter, a gas leak detector, a temperature sensor, a pressure sensor, a Ph meter, or a chemical sensor.

15. The convertible handheld device of claim 10, wherein the authentication code further provides the handheld device with a function of the cartridge.

16. A method for detecting a contaminant in a sample gas comprising:
contacting a sensor to a sample gas without the contaminant;
measuring a reference voltage generated by the sensor due to a thermal conductivity caused by contacting the sample gas without the contaminant to the sensor;
storing the reference voltage in a memory;
contacting a sample gas containing the contaminant to the sensor;
determining a measured voltage generated by the sensor due to a change in thermal conductivity caused by the contacting the sample gas including the contaminant to the sensor;
comparing the reference voltage to the measured voltage to detect existence of the contaminant; and
sending a difference between the reference voltage and the measured voltage to an electrical erasable programmable read-only memory (EEPROM) to determine rate of gas leakage of the contaminant being leaked.

17. The method for detecting a contaminant in a sample gas of claim 16, wherein the EEPROM includes a concentration lookup table.

18. The method of detecting a contaminant in a sample gas of claim 16, wherein the sample gas without the contaminant and the sample gas with potential contaminant is contacted to the sensor at a substantially similar flow rate.

19. The method of detecting a contaminant in a sample gas of claim 18, wherein the flow rate is from 7 mL/min to 15 mL/min.

* * * * *